United States Patent [19]
Lew

[11] Patent Number: 4,776,220
[45] Date of Patent: Oct. 11, 1988

[54] DUAL S-LOOP SINGLE TUBE CORIOLIS FORCE FLOWMETER

[76] Inventor: Hyok S. Lew, 7890 Oak St., Arvada, Colo. 80005

[21] Appl. No.: 14,278

[22] Filed: Feb. 12, 1987

Related U.S. Application Data

[63] Continuation-in-part of Ser. No. 941,352, Dec. 15, 1986.

[51] Int. Cl.$^4$ .............................................. G01F 1/84
[52] U.S. Cl. ................................................. 73/861.38
[58] Field of Search ......................... 73/861.37, 861.38

[56] References Cited

U.S. PATENT DOCUMENTS 4,559,833 12/1985 Sipin ................................. 73/861.38

Primary Examiner—Herbert Goldstein

[57] ABSTRACT

The mass flowmeter of the present invention comprises a conduit including a first sinuous section extending from an inlet leg and a second sinuous section extending from an outlet leg, wherein the first sinuous section includes a first smooth bend adjacent to the inlet leg and turning about a first direction, and a second smooth bend adjacent to the first smooth bend and turning about a second direction opposite to the first direction, and the second sinuous section includes a third smooth bend adjacent to the second smooth bend and turning about the second direction, and a fourth smooth bend intermediate the third smooth bend and the outlet leg and turning about the first direction, in which arrangement the first and second sinuous sections cross one another at least once at midsections thereof. Relative vibratory motions between the first and second sinuous sections imposed at midsections thereof create relative Coriolis torsional vibrations therebetween about an axis generally parallel to the two planes respectively including the first and second sinuous sections and perpendicular to the inlet and outlet legs, which relative Coriolis torsional vibrations has magnitude proportional to the mass flow rate of media moving through the conduit. Consequently, the mass flow rate is determined by measuring the Coriolis torsional vibrations.

18 Claims, 2 Drawing Sheets

DUAL S-LOOP SINGLE TUBE CORIOLIS FORCE FLOWMETER

BACKGROUND OF THE INVENTION

This is a continuation-in-part application to patent application Ser. No. 941,352 entitled "Dual S-tube Coriolis Force Flowmeter" filed on Dec. 15, 1986.

The measurements of fluid velocities at the lower limit of industrial flow measurements presents a serious challenge, as the intensity or strength of the physical phenomena used to measure the flow rate becomes very weak and overshadowed by ambient noises at the lower limit of flow measurement. The existing Coriolis force flowmeters of various designs employing U-tube or S-tube or O-tube design, include two parallel tubes superimposed to one another which bifurcate the fluid flow through a flowmeter into two equal halves respectively flowing through the two parallel tubes. While the dual tube design provides an advantage in imposing forced vibrations to the two tubes as the dual tubes respond to the vibrator in action-reaction mode that cuts off any energy leak to the supporting structures of the frame of the flowmeter, the dual tube design is highly undesirable in measuring low velocities of fluid as the actual measurement of the fluid velocity in such a design deals with the bifurcated flow in the dual tube, which is one half of the total flow moving through the flowmeter.

SUMMARY OF THE INVENTION

The primary object of the present invention is to provide a Coriolis force flowmeter that employs a single tube of a novel shape wherein the tube is vibrated under an action-reaction mode by an electromagnet.

Another object is to provide a Coriolis force flowmeter including a single tube with dual S-loops which are vibrated under an action-reaction mode that does not require a bifurcation of the fluid flow.

A further object is to provide a Coriolis force flowmeter capable of measuring low fluid velocities much lower than the minimum fluid velocities measurable with the existing Coriolis force flowmeters employing dual tubes.

Yet another object is to provide a Coriolis force flowmeter that requires minimum energy input and provides maximum Coriolis torque output.

Yet a further object is to provide a Coriolis force flowmeter that is immune to ambient noises.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
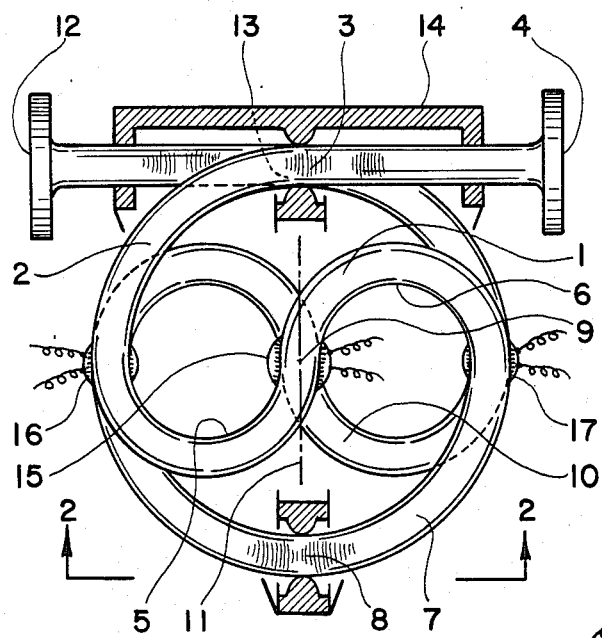
FIG. 1 illustrates a plan view of an embodiment of the dual S-loop single tube Coriolis force flowmeter constructed in accordance with the principles of the present invention.

In FIG. 1 there is illustrated a plan view of the dual S-loop single tube Coriolis force flowmeter constructed in accordance with the principles of the present invention. The first S-loop 1 disposed on a first plane comprises a first curved section 2 gradually turning in a first direction which extends from the first anchored section 3 adjacent to the first extremity 4 of the tube; a second curved section 5 sharply turning in the first direction extending from the first curved section 2; a third curved section 6 sharply turning in the second direction extending from the second curved section 5; and a fourth curved section 7 gradually turning in the second direction that is disposed intermediate the third curved section 6 and a second anchored section 8. It should be noted that the combination of the two curved sections 2 and 5, and the combination of the two curved sections 6 and 7 are axisymmetric to one another about an axis perpendicular to the plane including the first S-loop 1 and passing through the inflection point 9 of the first S-loop 1. The tube is routed from the first plane including the first S-loop 1 to a second plane including the second S-loop 10 in its routing across the second anchored section 8, wherein the second plane including the second S-loop 10 is generally parallel to the first plane including the first S-loop 1. The second S-loop 10 is rotationally symmetric to the first S-loop 1 about an axis 11 passing through the two anchored sections 3 and 8. The other extremity 12 of the tubing extending from the anchored section 13 of the second S-loop 10 is disposed in-line with the first extremity 4. The structures anchoring the tubing at three different sections 3, 8 and 13 is rigidly connected to the frame 14 of the flowmeter body. A vibrating means or electromagnet 15 is disposed at the inflection point 9 of the two S-loops 1 and 10 intermediate thereof. A pair of sensor means or transducers 16 and 17 for sensing the relative position or velocity or acceleration are respectively disposed intermediate the two S-loops 1 and 10 at two positions offset from the axis 11 passing through the two anchoring sections 8 and 3-13 where the two S-loops 1 and 10 cross one another.

Figure 2:
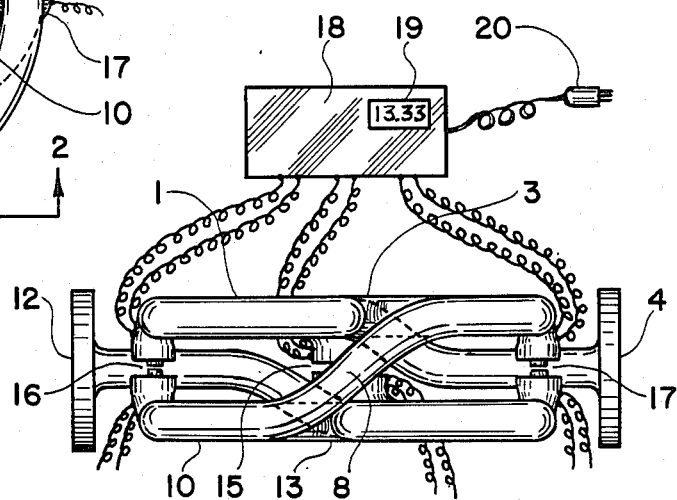
FIG. 2 illustrates an elevation view of the embodiment shown in FIG. 1.

In FIG. 2 there is illustrated an elevation view of the embodiment shown in FIG. 1 that is viewed through a plane 2—2 as shown in FIG. 1. For the brevity of the illustration, the frame and the anchoring structures belonging to the flowmeter body are not shown in this figure. The vibrating means or electromagnet 15 may comprise an electromagnet affixed to one of the two S-loops and a ferromagnetic or permanent magnet head affixed to the other of the two S-loops, or a pair of electromagnets respectively affixed to the two S-loops. Each of the sensor means or transducers 16 and 17 may includes a sensor coil or other type of sensor for detecting positions or velocities or accelerations which is affixed to one of the two S-loops and a target affixed to the other of the two S-loops that is detected by the sensor, or a pair of sensor-target combinations respectively affixed to the two S-loops. The electronic controller-processer 18 energizes the vibrating means or electormagnet 15 with an alternating electric current with a frequency that creates the maximum vibration of the two S-loops in the two opposing directions, and analyzes the electric signals from the sensor means or transducers 16 and 17. The amplitude of the Coriolis torque or torsion obtained from the signals from the sensor means 16 and 17, or the mass flow rate converted therefrom, may be displayed by a display means 19 or transmitted out by an output means 20.

The dual S-loop Coriolis force flowmeter illustrated in and described in conjunction with FIGS. 1 and 2 operates on the following principles: The vibrating means or electromagnet 15 vibrates the two S-loops 1 and 10 in the two opposite directions perpendicular to the planes including the two S-loops at a frequency. In general, it is desirable to energize the electromagnet with an alternating current with a frequency equal to the resonance frequency of the S-loop, whereby the small electrical power energizing the electromagnet creates the maximum Coriolis force. The oscillatory flexing motions of the two S-loops in the two opposite directions, e.g., in 180 degree phase difference, produce two oscillatory Coriolis torques of two opposite directions about the axis 11 passing through the two anchored sections of the S-loops in the two S-loops 1 and 10. The amplitude of the alternating Coriolis force torques is directly proportional to the mass flow rate of the fluid flowing through the tube comprising the two S-loops. The sensors or transducers 16 and 17 pick up the relative motions between the two S-loops which are created by the Coriolis force associated with the fluid flows as well as that directly induced by the forced vibration imposed by the electromagnet 15, wherein the former is antisymmetric between the two sensors 16 and 17 while the latter is symmetric therebetween. Therefore, the substraction of the two signals from the two sensors 16 and 17 therebetween yields the net effect of the Coriolis force associated with the fluid flow, from which the mass flow rate is determined by using an empirical formular obtained by the calibration process of the flowmeter. The signals associated with the forced vibrations by the electromagnet 15 or with the pipeline vibrations become canceled when the two signals from the two sensors 16 and 17 are substracted therebetween, as they are symmetric to one another. It is desirable that the specific design of anchoring for the securement of the anchored sections 3, 7 and 11 of the tubing satisfies one of the following conditions in order to produce the maximum Coriolis torsional deflections: The torsional rigidity or stiffness about the axis 11 provided by the anchoring should be small while it provides a rigid anchoring against the lateral movements relative to the axis 11, or it should be matched to the value that provides the same resonance frequency for the torsional deflections about the axis 11 as the resonance frequency of the flexural deflections of the two S-loops relative to the middle plane therebetween.

Figure 3:
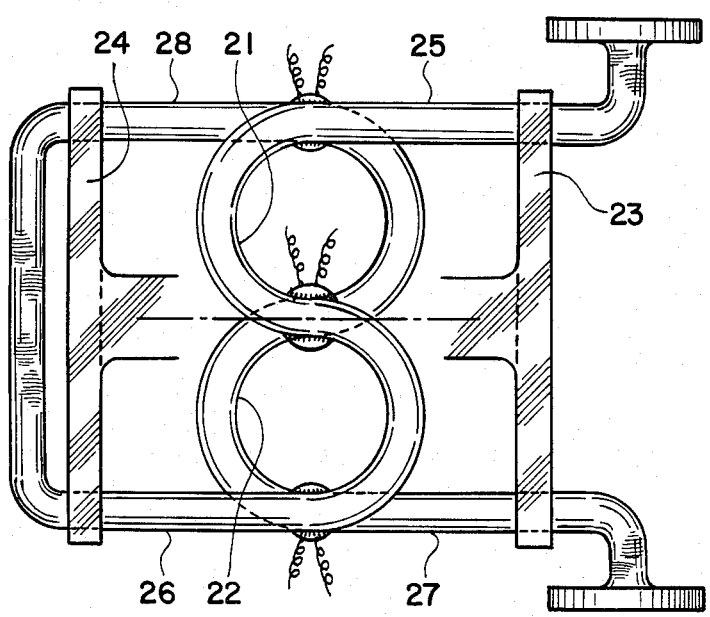
FIG. 3 illustrates plan view of a modified version of the embodiment shown in FIG. 1.

In FIG. 3 there is illustrated a plan view of a modified version of the embodiment shown in FIGS. 1 and 2, which has essentially the same construction and operates on the same principles as the embodiment shown in FIGS. 1 and 2. In this embodiment each pair of the two extremities of the S-sections 21 and 22 disposed intermediate two anchoring structures 23 and 24 are respectively connected to each pair of two straight sections 25 and 26, and 27 and 28, which are secured to and extending from the two anchoring structures 23 and 24, respectively. It can be readily seen that the two curved sections of the tube turning in the two opposite directions, which constitute each of the two S-sections, may be further extended in the same curved routing and, then, connected to the straight sections of the tube anchored to and extending from the anchoring structures. In such a modified arrangement, the two straight sections of the tube respectively extending from the two extremities of each of the two S-sections and anchored to the two anchoring structures will be spaced more closely to one another compared with the particular embodiment shown in FIG. 3.

Figure 4:
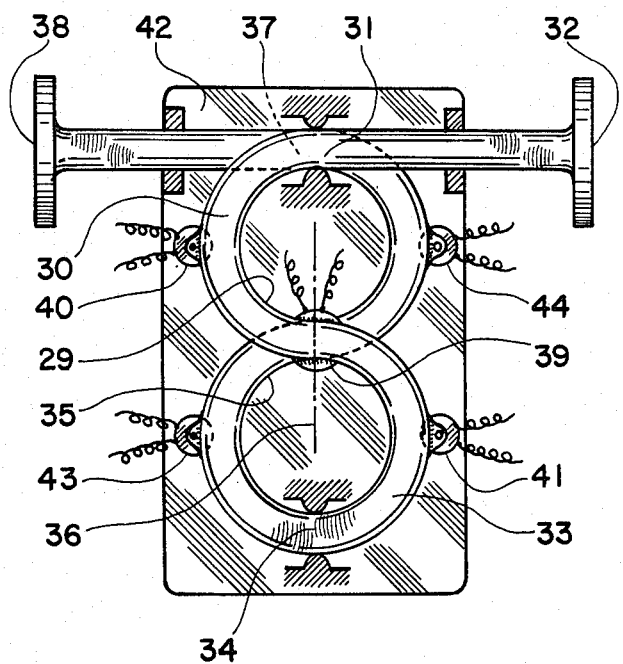
FIG. 4 illustrates a plan view of another embodiment of the dual S-loop single tube Coriolis force flowmeter of the present invention.

In FIG. 4 there is illustrated a plan view of another embodiment of the dual S-loop single tube Coriolis force flowmeter constructed in accordance with the principles of the present invention. The first S-loop 29 disposed on a first plane includes a first curved section 30 turning in a first direction that extends from the first anchored section 31 which is connected to the first extremity 32 of the tube. The second curved section 33 of the first S-loop 29 turning in a second direction extending from the first curved section 29 is connected to the second anchored section 34. The second anchored section 34 provides transition from the first S-loop 29 disposed on the first plane to the second S-loop 35 disposed on a second plane generally parallel to the first plane. The second S-loop 35 is rotationally symmetric to the first S-loop 29 about an axis 36 passing through the two anchored sections 31 and 34. One extremity of the second S-loop 35 opposite to the second anchored section 34 includes the third anchored section 37 that is extended to the second extremity 38 of the tube. The vibrating means or electromagnet 39 disposed intermediate the two S-loops 29 and 35 at the point of inflection thereof imposes a forced oscillatory flexural motion onto the midsections of the two S-loops 29 and 35 in two opposite directions substantially perpendicular to the planes including the two S-loops, respectively, which oscillatory flexural motion produces oscillatory Coriolis torques in the two S-loops 29 and 30 about the axis 36 passing through the two anchoring sections 34 and 31-37 in the two opposite directions, respectively. The amplitude of such oscillatory Coriolis torques is directly proportional to the mass flow rate of the fluid moving through the tube comprising the dual S-loops 29 and 35. The amplitude of the oscillatory torsional deflections of the first S-loop 29, that is also proportional to the mass flow rate, is measured by the first pair of sensor means or transducers 40 and 41 respectively included in the first and second curved sections 30 and 33 of the tube in an offset relationship with respect to the axis 36. Each of the first two sensors or transducers 40 and 41 include a sensor coil or other type of device sensing position or velocity or acceleration, that is affixed to the frame 42 of the flowmeter body, and a target affixed to the curved section of the first S-loop, which is detected by the sensor coil. The alternating Coriolis torsion about the axis 36 is antisymmetric, while the flexural motions produced by the electromagnet 39 and by the pipeline noise are symmetric between the two sensors 40 and 41. The subtraction of the two signals from the two sensors 40 and 41 therebetween yields net Coriolis torsion and cancels out the flexural motion associated with the forced vibration of the first S-loop 29 as well as that originating from the pipeline vibration. The alternating Coriolis torsion of the second S-loop 35 is measured by taking the difference between the two signals from the second pair of sensors or transducers 43 and 44 respectively included in the two curved sections of the second S-loop 35 in an off-set relationship with respect to the torsion axis 36. The mass flow rate is determined by multiplying a constant of proportionality to the amplitude of the alternating Coriolis torsions measured by one of the two pairs of sensors or by averaging the two measurements respectively provided by the two pairs of sensors. The constant of proportionality is determined by the calibrating process of the flowmeter. The anchoring means securing the anchored sections 31, 34 and 37 to the frame 42 should be designed per guidelines described in conjunction with the embodiment illustrated in FIGS. 1 and 2.

Figure 5:
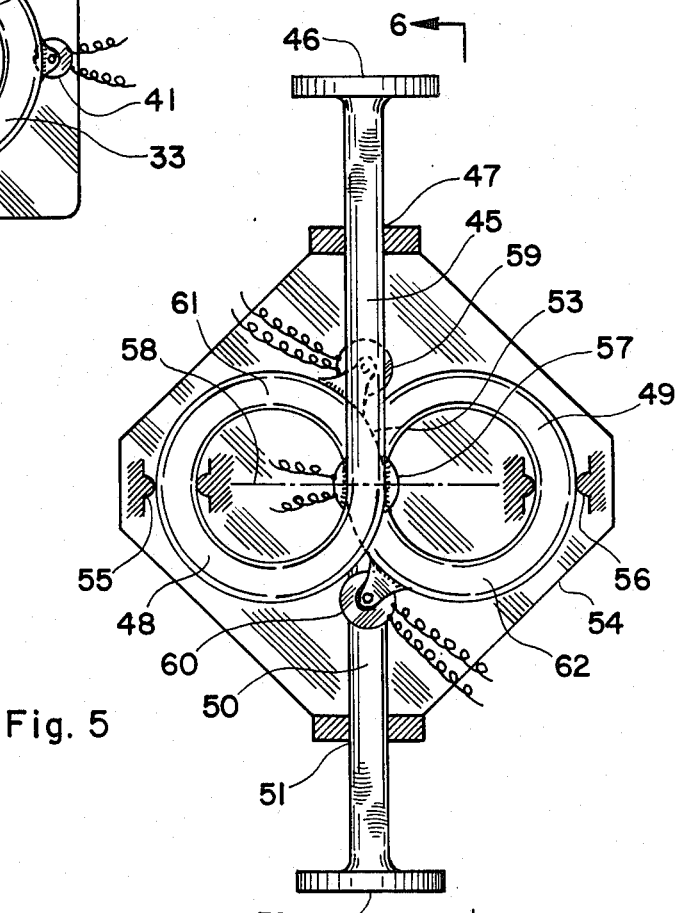
FIG. 5 illustrates a plan view of a further embodiment of the dual S-loop single tube Coriolis force flowmeter of the present invention.

In FIG. 5 there is illustrated a plan view of a further embodiment of the dual S-loop single tube Coriolis force flowmeter constructed in accordance with the principles of the present invention. The sinuating tube included in this embodiment of the Coriolis force flowmeter comprises a first substantially straight section 45 adjacent to the first extremity 46 that includes a first anchoring means 47; a first 360 degree loop 48 turning in the first direction tangentially connected to the first straight section 45, that is disposed on the first side of a first plane including the first straight section 45 and perpendicular to a plane including the first 360 degree loop 48; a second 360 degree loop 49 connected to the first 360 degree loop 48, that is disposed on the second side of the first plane opposite to the aforementioned first side; and a second substantially straight section 50 tangentially extending from the second 360 degree loop 49, that is disposed on the same first plane as that including the first straight section 45. The second straight section 50 includes the second anchoring means 51 and is extended to the second extremity 52 of the tube. The inflection section 53 intermediate the two 360 degree loops 48 and 49 is disposed intermediate two planes perpendicular to the aforementioned first plane and respectively including the first and second straight sections 45 and 50. The two 360 degree loops 48 and 49 are respectively anchored to the frame 54 by a pair of anchoring means 55 and 56 which secure the mid-sections of the 360 degree loops located at the farthest distance from the first plane including the two straight sections 45 and 50. The vibrating means or bar electromagnet 57 secured to the inflection section 53 intermediate the two 360 degree loops 48 and 49 vibrates the combination of the first straight section 45 and the first half of the first 360 degree loop 48 and the combination of the second straight section 50 and the second half of the second 360 degree loop 49 in two opposite directions generally perpendicular to the planes including the two 360 degree loops 48 and 49. Such a forced vibration produces alternating Coriolis torsions of opposite signs about the axis 58 passing through the two anchoring means 55 and 56 in the two 360 degree loops 48 and 49, which Coriolis torsion with amplitude proportional to the mass flow rate is measured by a pair of sensors or transducers 59 and 60, which respectively measure the relative position or relative velocity between the first straight section 45 and the second half 61 of the first 360 degree loop 48 and between the second straight section 50 and the first half 62 of the second 360 degree loop 49. The anchoring means 55 and 56 should substantially allow the pivoting motions of the two 360 degree loops 48 and 49 about the axis 58, while they should restrain the two 360 degree loops 48 and 49 from experiencing rectilinear rigid body motions in directions perpendicular to the planes including the two 360 degree loops 48 and 49. In the construction of the sensors or transducers, it is a good practice to include a target affixed to the 360 degree loop and sensing coil affixed to the straight section. As mentioned in conjunction with other embodiments respectively shown in FIGS. 1, 3 and 4, the net Coriolis torsion with amplitude proportional to the mass flow rate of the fluid is obtained by subtracting the two signals from the two sensors 59 and 60 from one another.

Figure 6:
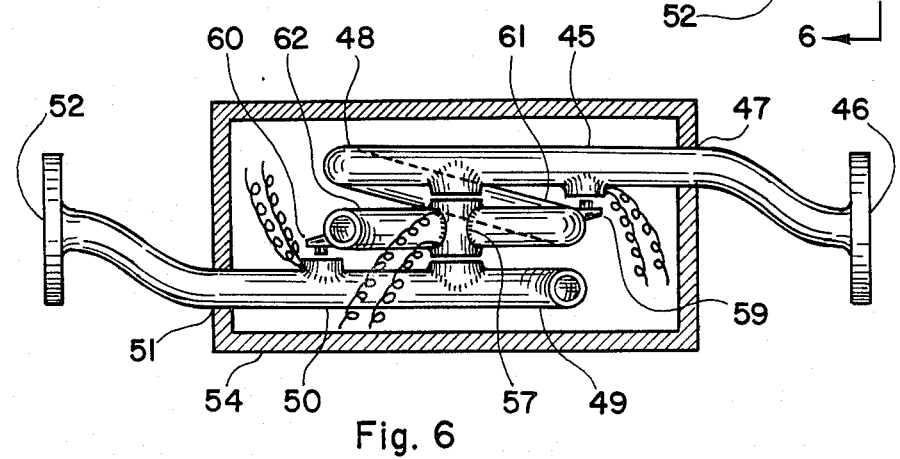
FIG. 6 illustrates a cross section of the embodiment shown in FIG. 5.

In FIG. 6 there is illustrated a cross section of the embodiment shown in FIG. 5, which cross section is taken along plane 6—6 as shown in FIG. 5. The vibrating means 57 includes a bar electromagnet affixed to the inflection section of the tube and a pair of ferromagnetic heads or permanent magnets respectively affixed to the junctions between the two 360 degree loops and the two straight sections of the tube.

In order to isolate the dual S-loop single tube included in the various embodiments of the Coriolis force flowmeter construction in accordance with the principles of the present invention from pipeline noise, noise absorbing washers or rings may be included in the anchoring means securing the dual S-loop single tube to the frame of the flowmeter body. The frequency of the forced vibration should be generally matched to the natural resonance frequency of the mass system being vibrated by the electromagnet. The anchoring means designed to allow the Coriolis torsions must have small resistance thereto or provide a stiffness wherein the resonance frequency of the system under the Coriolis torsional vibration is matched to the resonance frequency of the system under the forced vibration. The S-loop or 360 degree loops employed in the present invention may comprise sections of a circular loop as in the case of the illustrated embodiments or may include sections of elliptical loop in place of circular loop or comprise combination thereof.

While the principles of the present invention have now been made clear by the illustrated embodiments, there will be immediately obvious to those skilled in the art many modifications of the structures, arrangements, proportions, elements and materials which are particularly adapted to the specific working environments and operating conditions in the practice of the invention without departing from those principles.

I claim:

1. An apparatus for measuring flow rate comprising in combination:

(a) a conduit including a first sinuous section extending from an inlet leg secured to a support and disposed on a first hypothetical plane; and a second sinuous section extending from an outlet leg secured to the support and disposed on a second hypothetical plane, wherein said first sinuous section includes a first smooth bend adjacent to the inlet leg and turning about a first direction, and a second smooth bend adjacent to the first smooth bend and turning about a second direction opposite to said first direction, and said second sinuous includes a third smooth bend adjacent to the second smooth bend and turning about the second direction, and a fourth smooth bend intermediate the third smooth bend and the outlet leg and turning about the first direction wherein the first and third smooth bends cross one another at a first crossing point, the second and fourth smooth bends cross one another at a second crossing point and the first and second sinuous sections cross one another at a third crossing point intermediate the first and second crossing points;

(b) means for exerting oscillatory force to the first and second sinuous sections at the midsections thereof, wherein said means vibrates the first and second sinuous sections relative to one another in directions transverse to a plane generally parallel to said first and second hypothetical planes and thus creates oscillatory flexural movements of opposite signs for the first and second sinuous sections; and (c) a first sensor means for measuring relative vibratory motions between the first and third smooth bends, and a second sensor means for measuring relative vibratory motions between the second and fourth smooth bends, wherein the first and second sensor means in combination measure the difference between said two relative vibratory motions as a measure of mass flow rate of media moving through said conduit.

2. The combination as set forth in claim 1 wherein said means for exerting oscillatory force vibrates the first and second sinuous sections at resonance frequency thereof.

3. The combination as set forth in claim 1 wherein said conduit is secured to the support at a section intermediate the second and third smooth bends.

4. The combination as set forth in claim 1 wherein the first and second sinuous sections cross one another at a fourth crossing point located simultaneously intermediate the inlet leg and the first smooth bend and intermediate the outlet leg and the fourth smooth bend.

5. The combination as set forth in claim 4 wherein the first and second sinuous sections are secured to the support at said fourth crossing point.

6. The combination as set forth in claim 5 wherein said conduit is secured to the support at a section intermediate the second and third smooth bends.

7. The combination as set forth in claim 1 wherein said conduit includes a first straight leg intermediate the inlet leg and the first smooth bend, a second straight leg adjacent to the second smooth bend and connected to a third straight leg, which third straight leg is connected to the third smooth bend and a fourth straight leg intermediate the fourth smooth bend and the outlet leg.

8. The combination as set forth in claim 7 wherein the first and fourth straight legs are secured to the support.

9. The combination as set forth in claim 8 wherein the second and third straight legs are secured to the support.

10. An apparatus for measuring flow rate comprising in combination:

(a) a conduit including a first sinuous section extending from an inlet leg secured to a support and disposed on a first hypothetical plane; and a second sinuous section extending from an outlet leg secured to the support and disposed on a second hypothetical plane, wherein said first sinuous section includes a first smooth bend adjacent to the inlet leg and turning about a first direction, and a second smooth bend adjacent to the first smooth bend and turning about a second direction opposite to said first direction, and said second sinuous section includes a third smooth bend adjacent to the second smooth bend and turning about the second direction, and a fourth smooth bend intermediate the third smooth bend and the outlet leg and turning about the first direction wherein the first and second sinuous sections cross one another at midsections thereof;

(b) means for exerting oscillatory force to the first and second sinuous sections at the midsections thereof, wherein said means vibrates the first and second sinuous sections relative to one another in directions transverse to a plane generally parallel to said first and second hypothetical planes and thus creates oscillatory flexural movements of opposite signs for the first and second sinuous sections; and (c) a first sensor means for measuring vibratory motions of at least one of the first and third smooth bends, and a second sensor means for measuring vibratory motions of at least one of the second and fourth smooth bends, wherein the first and second sensor means in combination measure the difference between said two vibratory motions as a measure of mass flow rate of media moving through said conduit.

11. The combination as set forth in claim 10 wherein said means for exerting oscillatory force vibrates the first and second sinuous sections at resonance frequency thereof.

12. The combination as set forth in claim 10 wherein said conduit is secured to the support at a section intermediate the second and third smooth bends.

13. The combination as set forth in claim 12 wherein the first and second sinuous section cross one another at a crossing point located simultaneously intermediate the inlet leg and the first smooth bend and intermediate the outlet leg and the fourth smooth bend.

14. The combination as set forth in claim 13 wherein said sinuous first and second sections are secured to the support at said crossing point.

15. The combination as set forth in claim 14 wherein said conduit is secured to the support at a section intermediate the second and third smooth bends.

16. An apparatus for measuring flow rate comprising in combination:

(a) a conduit including an inlet and outlet leg disposed on a common plane in a spaced relationship therebetween and secured to a support at two opposing extremities thereof, and a first and second 360 degree loops respectively disposed at two opposite sides of said common plane and respectively turning about two opposite directions wherein images of the first and second 360 degree loops projected on a plane generally perpendicular to said common plane and generally parallel to the inlet and outlet legs are symmetric to one another about said common plane, wherein a section of the first 360 degree loop extending from the inlet leg and a section of the second 360 degree loop extending from the outlet leg connected to one another are disposed intermediate the inlet and outlet legs in a spaced relationship therefrom;

(b) means for exerting oscillatory force to the inlet and outlet legs at extremities thereof respectively connected to the first and second 360 degree loops, wherein said means vibrates the combination of the inlet leg and the first 360 degree loop and the combination of the outlet leg and the second 360 degree loop relative to one another in directions transverse to a plane generally parallel to the first and second 360 degree loops and thus creates oscillatory flexural movements of opposite signs for said two combinations; and (c) a first sensor means for measuring relative vibratory motions between a section of the inlet leg adjacent to the first 360 degree loop and a section of the first 360 degree loop adjacent to the second 360 degree loop, and a second sensor means for measuring relative vibratory motions between a section of the outlet leg adjacent to the second 360 degree loop and a section of the second 360 degree loop adjacent to the first 360 degree loop, wherein the first and second sensor means in combination measure the difference between said two relative vibratory motions as a measure of mass flow rate of media moving through said conduit.

17. The combination as set forth in claim 16 wherein said means for exerting oscillatory force vibrates the combination of the inlet leg and the first 360 degree loop and the combination of the outlet leg and the second 360 degree loop at resonance frequency thereof.

18. The combination as set forth in claim 16 wherein the first and second 360 degree loops are secured to the support at midsections thereof.

* * * * *